UNITED STATES PATENT OFFICE.

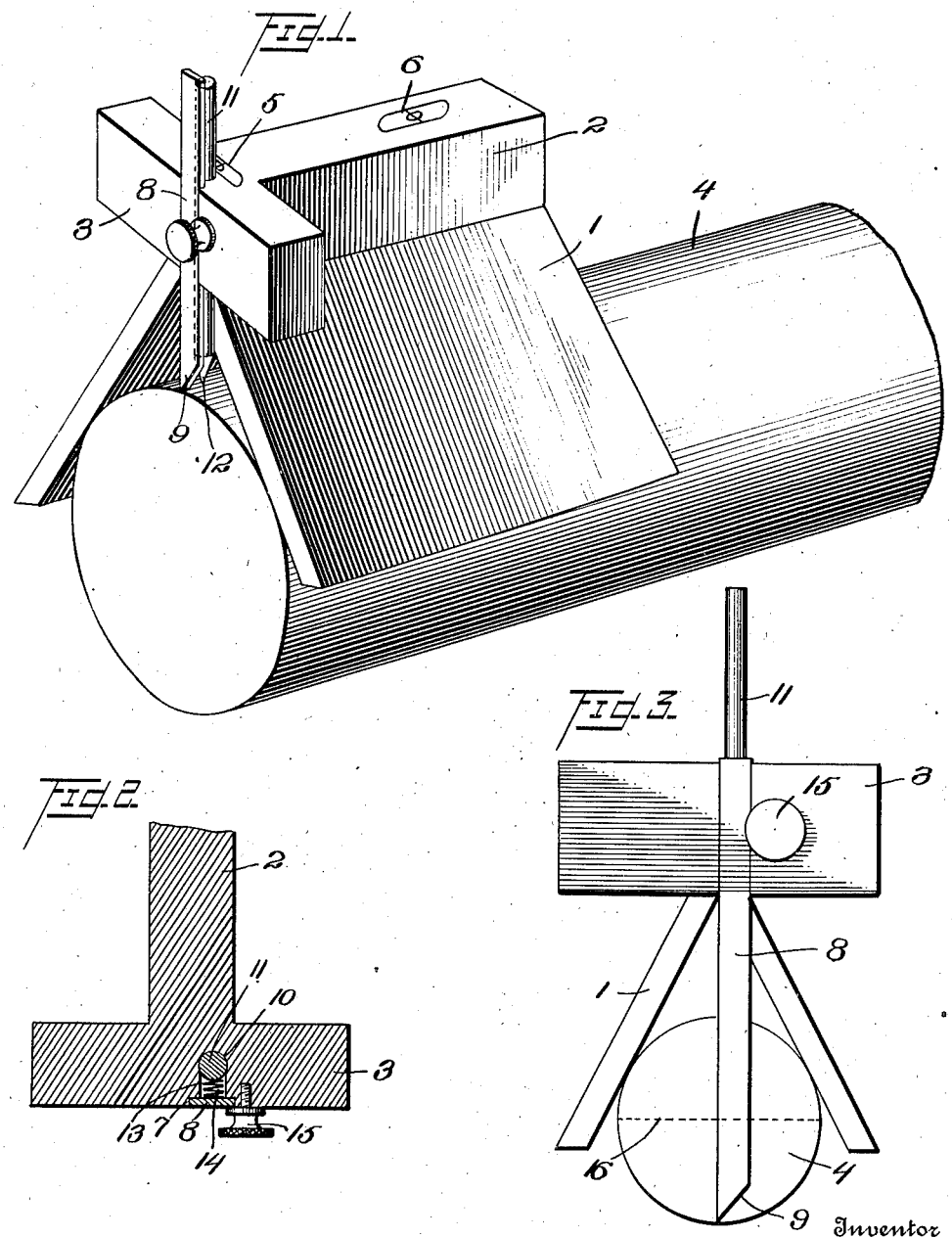

JAMES EDWARD TSCHOP, OF LEBANON, PENNSYLVANIA.

MEASURING AND MARKING INSTRUMENT.

986,783.  Specification of Letters Patent.  Patented Mar. 14, 1911.

Application filed October 4, 1910. Serial No. 585,195.

*To all whom it may concern:*

Be it known that I, JAMES E. TSCHOP, a citizen of the United States, residing at Lebanon, in the county of Lebanon and State of Pennsylvania, have invented certain new and useful Improvements in Measuring and Marking Instruments, of which the following is a specification.

My invention relates to improvements in measuring and marking instruments, more particularly designed for use in connection with circular or cylindrical work, such as shafts and the like, and designed not only to scratch or mark lines and pricks on the cylindrical body, but also to find the center of the body.

A further object is to provide an improved device of this character which is of extremely simple inexpensive construction, strong and durable in use.

With these and other objects in view, the invention consists in certain novel features of construction and combinations and arrangements of parts, as will be more fully hereinafter described and pointed out in the claims.

In the accompanying drawings: Figure 1, is a perspective view illustrating my improvements. Fig. 2, is a view in horizontal section through the head of the instrument, and Fig. 3, is a view in end elevation illustrating my improvements in position to find the center of a cylindrical body.

The body of the instrument may be made in various ways, for example, may comprise a single integral casting having flared wings 1, 1, constituting an inverted V-shape support for the longitudinal body 2 and the cross head 3 at one end of the body, and extending at right angles thereto. These wings 1, 1, are adapted to be positioned on the cylindrical work illustrated at 4, and a level may be had by the water levels 5 and 6 in the head 3, and body 2 respectively, the level 5 operating transversely and the level 6 longitudinally.

Head 3 is provided in its front face with a vertical groove 7, in which a flat bar or marker 8 is located, said groove so positioned that the edge of said marker is in line with the center of the instrument, and the marker is beveled at its lower end as shown at 9 forming a sharp cutting edge which, when the instrument is drawn along the work, will scratch or mark a line in the work. The head is also provided with a vertically disposed opening 10, in which a cylindrical rod or pricker 11 is positioned, the lower end of the latter made conical forming a sharp point 12. The groove 7, and the opening 10, are connected by a hole 13, in which a coiled spring 14 is located bearing at one end against the marker 8, and at its other end against the pricker 11, and against the outer face of said marker 8, a thumb screw 15 screwed into the head 3 bears, and pressing inward against the marker 8, holds the latter and exerts spring tension on the pricker 11, so that they are maintained in proper relation to each other and to the work.

As shown most clearly in Fig. 3, marker or bar 8 may be readily utilized to find the longitudinal center of the work, and this is accomplished by extending the marker across the end of the work, using the marker as a straight edge to draw a line such as shown at 16 across the end of the work, and then turning the instrument and marking another line, the point of crossing of said lines being of course the exact center of the work.

Various slight changes might be made in the general form and arrangement of parts described, without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an instrument of the character described, the combination with a body, wings on said body at an angle to each other adapted to support the body on cylindrical work, of a marker adjustably secured to the body and having one edge in line with the center of the body, and its lower end beveled forming a sharp cutting edge, a pricker supported by said body, said pricker supported in the body in rear of the marker, and having a sharpened lower end in line with the marking edge of the marker, a spring frictionally engaging said marker and said pricker, and a thumb screw pressing inwardly against said marker, substantially as described.

2. In an instrument of the character described, the combination with a body, supporting wings on the body at an angle to each other, a transverse head on one end of said body, a longitudinal level in said body, and a transverse level in said head, of a marker comprising a bar having a beveled end, said head having a groove at its outer face to receive said marker and hold it in position to center one edge of the marker, said head having an opening therethrough back of the marker groove, and having a hole connecting said opening with the marker groove, a pricker in said opening, a spring in said hole bearing against the marker and the pricker respectively, and a thumb screw in the end of said head bearing against said marker, substantially as described.

In testimony whereof I have signed my name to this specification in the presence of two subscribing witnesses.

JAMES EDWARD TSCHOP.

Witnesses:
PETER GEIGER,
W. K. KLICK.